US012683790B2

(12) United States Patent (10) Patent No.: US 12,683,790 B2

Larmuseau (45) Date of Patent: Jul. 14, 2026

(54) PROTOCOL FOR TRUSTWORTHY, PRIVACY PRESERVING GENOMIC DATABASE DISCOVERY

(71) Applicant: KONINKLIJKE PHILIPS N.V., Eindhoven (NL)

(72) Inventor: Adriaan Joris H Larmuseau, Zwevegem (BE)

(73) Assignee: Koninklijke Philips N.V., Eindhoven (NL)

( * ) Notice: Subject to any disclaimer, the term of this patent is extended or adjusted under 35 U.S.C. 154(b) by 131 days.

(21) Appl. No.: 17/798,093

(22) PCT Filed: Feb. 3, 2021

(86) PCT No.: PCT/EP2021/052453
§ 371 (c)(1),
(2) Date: Aug. 8, 2022

(87) PCT Pub. No.: WO2021/160475
PCT Pub. Date: Aug. 19, 2021

(65) Prior Publication Data
US 2023/0076882 A1 Mar. 9, 2023

(30) Foreign Application Priority Data

Feb. 11, 2020 (WO) ................ PCT/CN2020/074710
May 12, 2020 (EP) .................................... 20174004

(51) Int. Cl.
*H04L 9/32* (2006.01)
*H04L 9/00* (2022.01)

(52) U.S. Cl.
CPC .......... *H04L 9/3218* (2013.01); *H04L 9/3231* (2013.01); *H04L 9/3252* (2013.01); *H04L 9/50* (2022.05)

(58) Field of Classification Search
CPC ....... H04L 9/32; H04L 9/3218; H04L 9/3226; H04L 9/3231; H04L 9/3247; H04L 9/3252; H04L 9/50
See application file for complete search history.

(56) References Cited

U.S. PATENT DOCUMENTS

2011/0145589 A1 6/2011 Camenisch
2012/0005098 A1 1/2012 Gross et al.
(Continued)

FOREIGN PATENT DOCUMENTS

EP      3452929 A1    3/2019
KR    101946555 B1    5/2019
WO  2017190795 A1   11/2017

OTHER PUBLICATIONS

Ben-Sasson et al., Secure Sampling of Public Parameters for Succinct Zero Knowledge Proofs, 2015 IEEE Symposium on Security and Privacy, p. 287-304. (Year: 2015).*
(Continued)

*Primary Examiner* — D'Arcy Winston Straub

(57) ABSTRACT
A system and method for validating by a requestor that a responder has genomic data meeting specified requirements, including: digitally publishing the specified requirements; performing a non-interactive zero-knowledge (NIZK) proof with the responder; verifying that the responder has genomic data meeting the specified requirements based upon the results of the NIZK proof; and receiving encrypted genomic data meeting the specified requirement from the responder.

18 Claims, 3 Drawing Sheets

(56) References Cited

U.S. PATENT DOCUMENTS

| | | | |
|---|---|---|---|
| 2019/0089372 A1 | 3/2019 | Roth | |
| 2019/0253253 A1* | 8/2019 | Yang | G16H 10/60 |
| 2020/0044863 A1* | 2/2020 | Yadlin | G06F 9/54 |
| 2020/0174990 A1* | 6/2020 | Pratkanis | H04L 9/0637 |
| 2020/0193425 A1* | 6/2020 | Ferenczi | H04L 9/0643 |
| 2020/0327250 A1* | 10/2020 | Wang | G06N 20/00 |
| 2021/0297255 A1 | 9/2021 | Wan | |

OTHER PUBLICATIONS

Gibney "The Scant Science Behind Cambridge Analytica's Controversal Marketing Techniques" Nature, Mar. 29, 2018 p. 1115-1117.

Grishin, D., Obbad, K. & Church, G.M. Data privacy in the age of personal genomics. Nat Biotechnol 37, 1115-1117 (2019). https://doi.org/10.1038/s41587-019-0271-3.

Ben-Sasson Eli et al Secure Sampling of Public Parameters for Succinct Zero Knowledge Proofs, 2014 IEEE Symposium of Security and Privacy May 17, 2015 p. 287-304.

International Search Report and Written Opinion From PCT/EP2021/052453 Mailed Apr. 23, 2021.

* cited by examiner

PROTOCOL FOR TRUSTWORTHY, PRIVACY PRESERVING GENOMIC DATABASE DISCOVERY

CROSS REFERENCE TO RELATED APPLICATIONS

This application is a U.S. national phase application of International Application No. PCT/EP2021/052453 filed on Feb. 3, 2021, which claims the benefit of CN Application Serial No. PCT/CN2020/074710 filed on Feb. 11, 2020 and EP Application Serial No. 20174004.0 filed on May 12, 2020 and are incorporated herein by reference.

TECHNICAL FIELD

Various exemplary embodiments disclosed herein relate generally to a protocol for trustworthy, privacy preserving genomic database discovery.

BACKGROUND

A user of genomic data may desire to assemble a large set of high quality and trusted genomic data for various purposes. The exchange of such genomic data may be done using privacy protecting techniques in order to meet various privacy requirements associated with genomic data. Privacy preserving computational techniques may be used on genomic databases to meet these privacy requirements.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for validating by a requestor that a responder has genomic data meeting specified requirements, including: digitally publishing the specified requirements; performing a non-interactive zero-knowledge (NIZK) proof with the responder; verifying that the responder has genomic data meeting the specified requirements based upon the results of the NIZK proof; and receiving encrypted genomic data meeting the specified requirement from the responder.

Various embodiments are described, wherein the NIZK proof uses one of zero-knowledge succinct non-interactive arguments of knowledge (zk-SNARK) protocol, zero-knowledge scalable and transparent argument of knowledge (zk-STARK) protocol, and succinct non-interactive arguments (SNARG) protocol.

Various embodiments are described, wherein the requirements include a public digital signature key for sources of genomic data that the responder trusts.

Various embodiments are described, wherein the public digital signature key is for a specific genomic sequencer.

Various embodiments are described, wherein the public digital signature key is for a specific medical trial.

Various embodiments are described, wherein the requirements further include a threshold value that indicates the amount of genomic data required.

Various embodiments are described, wherein the NIZK proof receives as input the specific requirements and genomic data with associated digital signatures from the responder that satisfies the specific requirements.

Various embodiments are described, wherein the digital signature uses elliptic curve digital signature protocol.

Various embodiments are described, wherein the genomic data is hashed before being input to the NIZK proof.

Various embodiments are described, wherein the specified requirements are published on one of a webpage or a blockchain.

Various embodiments are described, further including publishing a proving key and a verification key, wherein the proving key and verification key are output from the NIZK proof.

Further various embodiments relate to a method for providing a validation by a responder that the responder has genomic data meeting specified requirements of a requestor, including: determining that responder has genomic data meeting the specified requirements published by the requestor; performing a non-interactive zero-knowledge (NIZK) proof with the requester; receiving a request from the requestor for the genomic data meeting the specified requirements; and transmitting encrypted genomic data meeting the specified requirement to the requestor.

Various embodiments are described, wherein the NIZK proof uses one of zero-knowledge succinct non-interactive arguments of knowledge (zk-SNARK) protocol, zero-knowledge scalable and transparent argument of knowledge (zk-STARK) protocol, and succinct non-interactive arguments (SNARG) protocol.

Various embodiments are described, wherein the requirements include a public digital signature key for sources of genomic data that the responder trusts.

Various embodiments are described, wherein the public digital signature key is for a specific genomic sequencer.

Various embodiments are described, wherein the public digital signature key is for a specific medical trial.

Various embodiments are described, wherein the requirements further include a threshold value that indicates the amount of genomic data required.

Various embodiments are described, wherein the NIZK proof receives as input the specific requirements and genomic data with associated digital signatures from the responder that satisfies the specific requirements.

Various embodiments are described, wherein the digital signature uses elliptic curve digital signature protocol.

Various embodiments are described, wherein the genomic data is hashed before being input to the NIZK proof.

Various embodiments are described, wherein the specified requirements are published on one of a webpage or a blockchain.

Various embodiments are described, further including publishing a proving key and a verification key, wherein the proving key and verification key are output from the NIZK proof.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
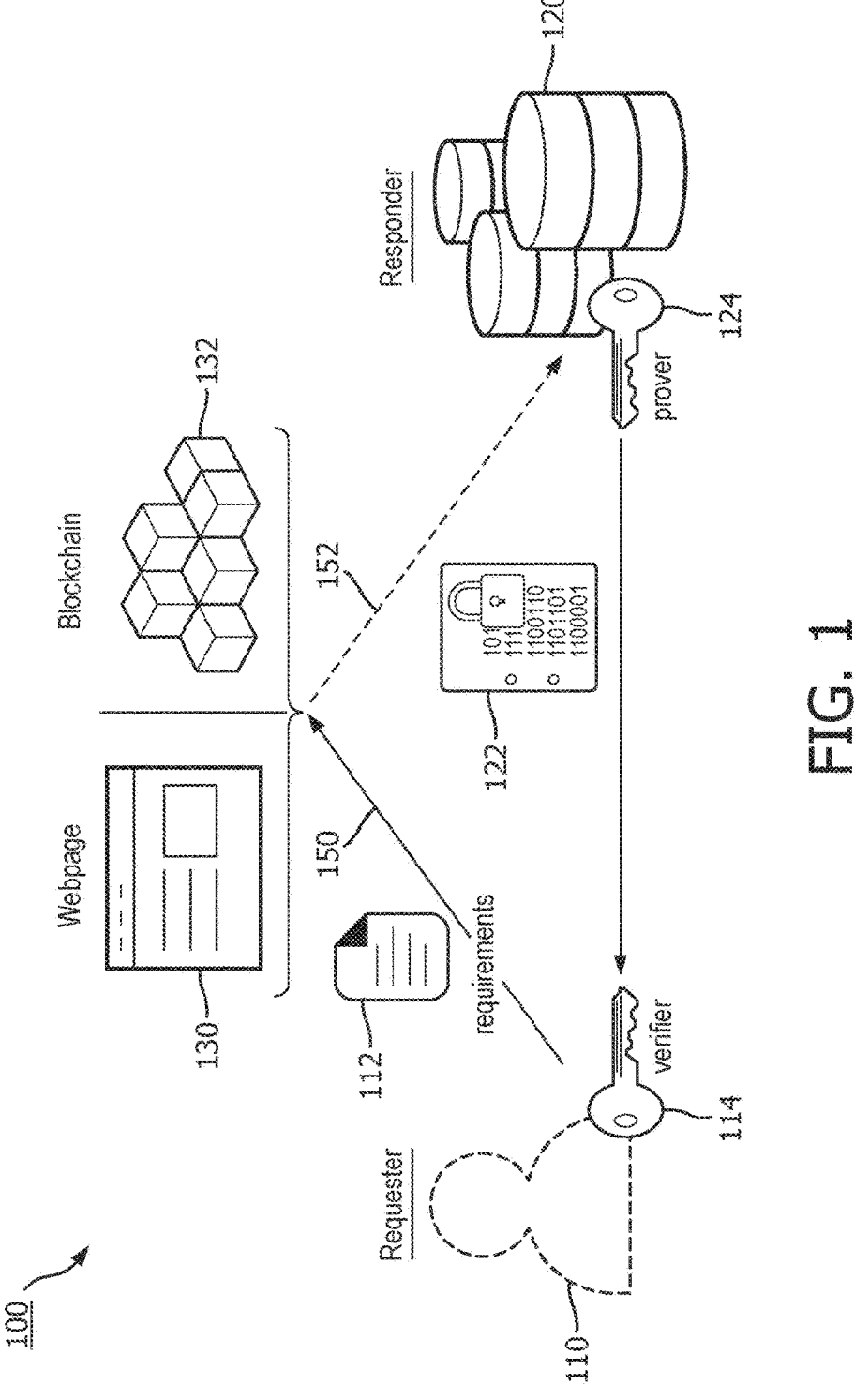
FIG. 1 illustrates a block diagram of the genomic data protocol.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

The generation of fake genomic data has become very advanced, and as a result, the genomic industry is now in need of tools and techniques that both preserve privacy and ensure authenticity of the underlying data.

While it is positive that genomic databases now value and enforce privacy protection for their genomic data, this does come with one big drawback: the quality of a private genome database is hard to asses. Consider the scenario where a company is interested in buying some kind of access to private genomic data. How does the company compare two or more private genomic databases without violating the privacy of the underlying data? How does the company verify the quality and volume of their data? How does the company prevent itself from paying for a private database filled with machine learning generated genomic data? These questions pose a real drawback to the number of possible transactions between owners and buyers of private genomic data. A genomic data protocol is disclosed herein that solves all these questions through the interchange of cryptographic proofs between parties.

In a first approach, the two parties to the exchange of genomic data need to establish some sort of trusted relationship that allows for secure, private, and trusted access to a genomic database. Such an approach may consume a lot of effort and resources, especially when the party seeking access to private genomic data determines that the private genomic data does not meet its needs. In a second approach, such an exchange may be facilitated by a trusted third party. But again, the second approach may have the same issues associated with the first approach. Both approaches also require that the party seeking the genomic data find the potential sources of the genomic data and identify potential providers of the desired genomic data. On the flip side, providers of genomic data are looking for ways to sell access to their data while providing authentication of the data and while maintaining privacy of the data. The genomic data protocol described herein helps to facilitate such interactions.

The genomic data protocol described herein is a decentralized protocol for the discovery of private genomic databases that contain a suitable amount of trustworthy genomic data. This genomic data protocol works by the exchange of zero knowledge proofs, which securely prove the origins and volume of genomic data (or other desired requirements for the genomic data), between interested parties. The requester publishes a request for genomic data, for example, on a webpage or a blockchain that are publicly available or available to providers of genomic data. Such a request may seek a certain volume of trustworthy genomic data. A genomic data provider may see the request, and then may engage of the exchange of a zero knowledge proof to prove to the requester that they can provide the requested genomic data.

A non-interactive zero-knowledge proof (NIZK) may prove that the genomic data provider commits to possessing genomic data satisfying the request from the requester. NIZKs are a type of zero-knowledge proof. Zero-knowledge proofs are known in the field of cryptography per se as a way to let a proving party prove to a verifying party that the proving party knows a certain value satisfying a certain property @. In this case, the device may construct a NIZK for each satisfied predefined property, proving that the provider commits to possessing genomic data satisfying the requested property. Interestingly, it is known from cryptography that for various statements, proving such statements @ is possible without having to reveal the value itself. In general, such a proof may involve a sequence of interactions, e.g., involving one or more queries by the verifying party that are answered by the proving party, that in the end convince the verifying party that the proving party indeed knows a correct value x. As an abstract example of the concept of zero-knowledge proofs, the "Ali Baba cave" example as discussed on https://en.wikipedia.org/w/index.php?title=Zero-knowledge_proof&oldid=901394099 (incorporated herein by reference for all purposes) is referred to. In the present case, the zero-knowledge proof may be a non-interactive zero-knowledge proof, e.g., a proof for a particular set of genomic data may meet specific requirements of the requestor.

In the examples below a zero-knowledge succinct non-interactive arguments of knowledge (zk-SNARK) proof is used as an example of a NIZK proof. zk-SNARK is a cryptographic proof technique for establishing knowledge or ownership in a manner that preserves confidentiality (see Short non-interactive zero-knowledge proofs, In Proceedings of ASIACRYPT 2010, which is incorporated herein for all purposes). Increasingly, zk-SNARKs are being applied to authenticate and hide the data used in transactions between peers, particularly in the area of blockchain based assets where confidentiality is crucial. As discussed above, in the area of genomics confidential transactions are of increasing interest as the industry moves towards privacy preserving computational techniques on genomic databases. However, the generation of fake genomic data has become very advanced and may be hard to detect. Accordingly, a user may want to be able to verify the source of the data requested. It is noted that various other known and yet to be developed types of zero-knowledge proofs, e.g., zero-knowledge scalable and transparent argument of knowledge (zk-STARK), succinct non-interactive arguments (SNARG), etc., may be used in the genomic data protocol as well with similar advantages.

FIG. 1 illustrates a block diagram 100 of the genomic data protocol. The proposed protocol involves the use of a zk-SNARK proof protocol between a requester 110 who is the party that is looking to find a private database that meets certain conditions and a responder 120 who is a private genomic database owner that seeks to prove that they can meet the conditions of the request without revealing private data. The requester 110 determines a set of conditions that define the genomic data being sought that make up a request 112 for genomic data. As will be described further below, such a request 112 may include a minimum number of samples from one or more specific data sources trusted by the requester 110. In another embodiment, the request may identify that n samples are requested from a first source, m samples from a second source, etc. The request can be simple or contain a number of different conditions that the provider must satisfy. This request may be uploaded 150 to a web page 130 or a blockchain 132. Such a web page 130 and blockchain 132 may be publicly available, or may be private in that it grants access only to certain parties. A responder 120 who is looking to grant access to their data, either for compensation, for swapping with the requestor, or for other medical purposes, accesses 152 the request 112 from either the web page 130 or the blockchain 132. The responder 120 will then verify that they have the amount and type of data indicated in the request 112.

Next, the responder 120 will produce a proof 122 (a zk-SNARK) for the conditions that the requester 110 has uploaded on the webpage 130 or blockchain 132, and the requester 110 will verify the proof. In this example, the conditions may include a set of public keys PKi and a threshold value n. The set of public keys PKi serve as the cryptographic identifiers for the sources of genomic data that the requester 110 trusts. The threshold value n represents the minimum number of genomic samples that should be digitally signed by one of those keys. Both the set of PKi and the threshold n serve as the public inputs for the zk-SNARK proof created by the responder 120. In addition the zk-SNARK takes in a private input from the responder, that is their private genome samples. The zk-SNARK proof function f works by checking that n or more of the private genome samples are correctly signed by a public key from the set PKi. The zk-SNARK proof results in a public verification key 114 and proving key 124. The requester 114 may now verify the proof 122 using the verification key 114. It is noted that others who have access to the public verification key 114 may also verify the proof. Accordingly, the verifier key 114 and the proving key 124 may be stored on the webpage 130 or the block chain 132. This will allow other requesters who are interested in the same data specified in the request 112 to easily verify that the responder 120 has the requested data. This will make it easier for other requestors and the responder 120 to share genomic data.

Figure 2:
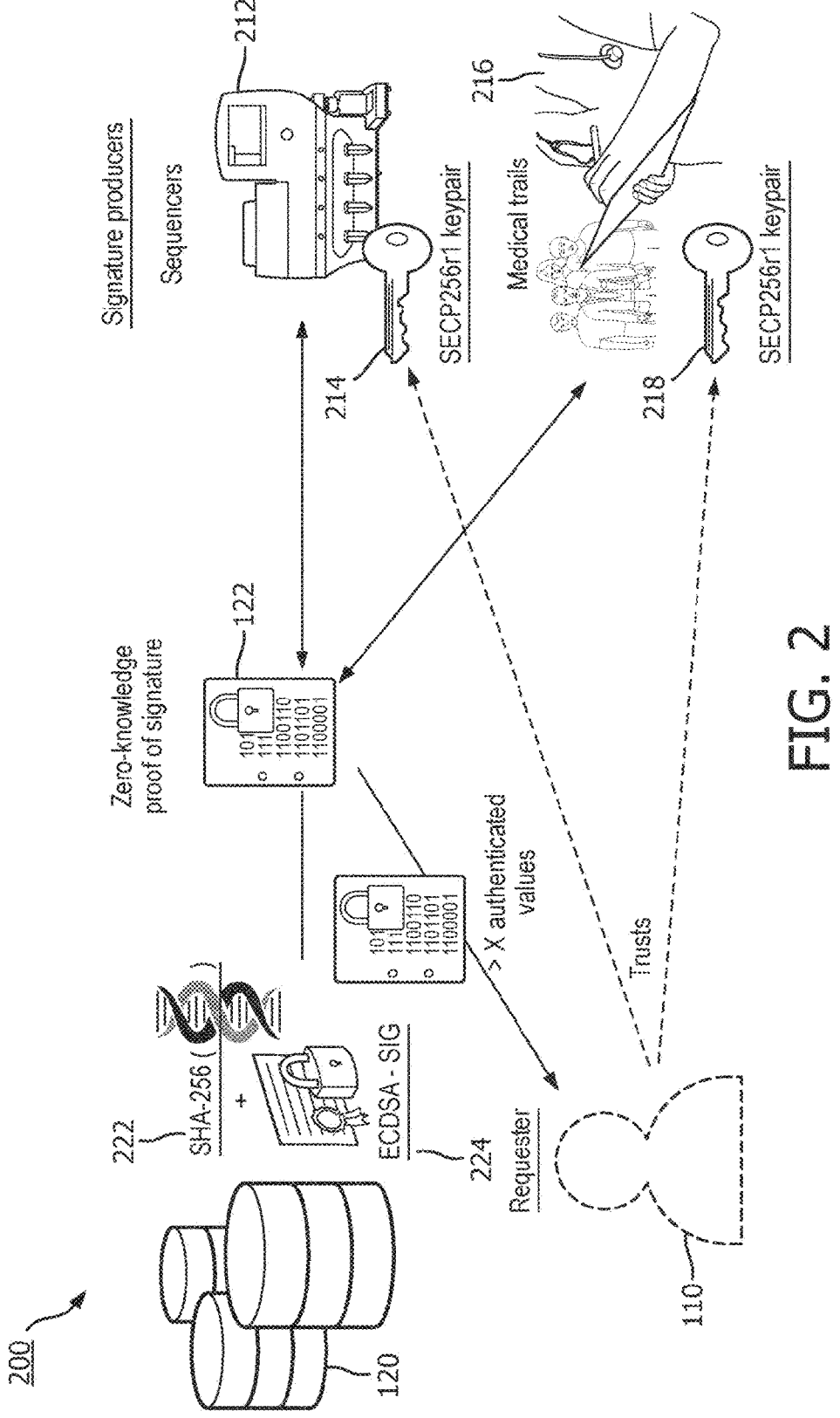
FIG. 2 provides a block diagram of a specific example of an implementation of the genomic data protocol.

FIG. 2 provides a block diagram 200 of a specific example of an implementation of the genomic data protocol. A requestor 110 may indicate that they trust certain sources of genomic data such as data from specific sequencers 212 or certain medical trials 216. Further, the requestor may state that they would like a certain number n of samples. The requirements then would include the public digital signing key of the trusted sources and the number of samples to be provides for each trusted source. The sequencer 212 may digitally sign the sequence results produced using asymmetric cryptography key pairs. In this disclosure, specific sequencers could in a single sequencer, a specific model of sequencer, all sequences from a specific manufacturer, or any combination of these, as long as the same private signing key(s) is used by all of the specific sequencers. For example, a manufacturer of sequencers may publish a public signing key 214 for its sequencers, or for example, each specific model may have its own public signing key. Then when the sequencer produces genomic data, that data is signed using the private key, such that the signed results may be verified using the public key. This allows for a user of the data to be verify the source of the genomic data and to trust the genomic data, because they trust the specific sequencers. That same may be done for medical trial data 216, that is digitally signed using the public signing key of a asymmetric key pair 218 associated with the medical trial, which public signing key may be verified and trusted by the requestor.

A practical deployment of the genomic data protocol may be achieved by means of elliptic curve cryptography, such as for example, using the secp256r1 curve for implementing the asymmetric cryptography key pairs, and then using elliptic curve digital signature algorithm (ECDSA) to digitally sign the genomic samples. It is noted that it is possible to use other digital signature schemes as well, for example RSA and ElGamal. For example, the responder 120 will have signed samples of genomic data 224. To reduce the data size of the genomic data samples input into the zk-SNARK protocol, the genomic data may optionally be hashed 222 with an algorithm such as SHA-256 (secure hash algorithm with a 256 bit output), but any other hash function may be used as well.

To implement the zk-SNARK protocol, a library such as MIT's libSnark may be used to implement the proof function f as a sequence of rank-1 constraints. Subsequently, the library compiles the function f into a quadratic span program. This quadratic span program is then input into a zk-SNARK generator together with a random secret element. The result of this are public proving and verification keys (see FIG. 1, 114, 124). The responder uses this public proving key together with the public inputs (the set of public ECC keys and threshold number of data sequences n) and the secret input (the signed genome samples, possibly hashes) to create the proof 122. The requester 110 verifies the proof 122 by means of the public verification key 114. Note that any other party with the public verification can do the same. Finally, the conditions (the public key set PKi, the threshold value n) as well as the public proving key 124 and verification key 114 can be uploaded on a blockchain 132 or a website 130.

Figure 3:
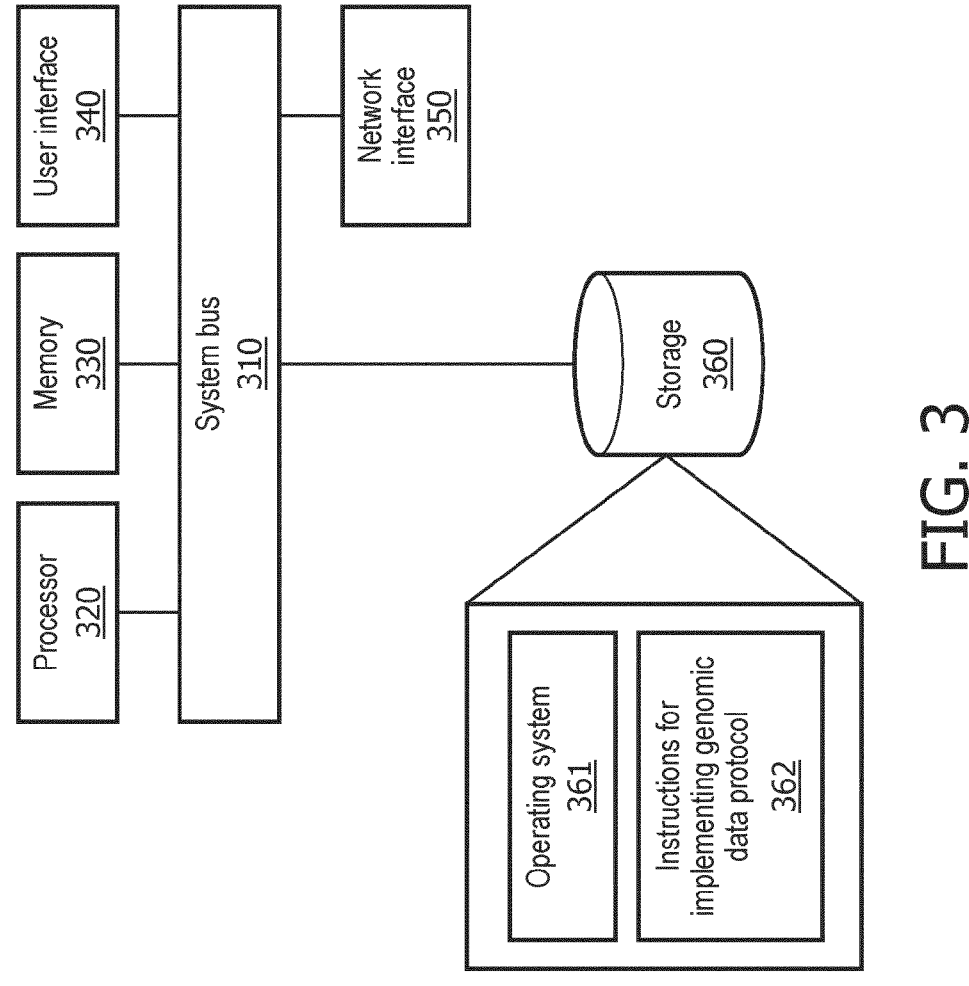
FIG. 3 illustrates an exemplary hardware diagram for implementing the genomic data protocol of FIGS. 1 and 2 as well as implementing various parts of the system.

FIG. 3 illustrates an exemplary hardware diagram 300 for implementing the genomic data protocol of FIGS. 1 and 2 as well as implementing various parts of the system. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, a graphics processing unit (GPU), field programmable gate array (FPGA), application-specific integrated circuit (ASIC), any processor capable of parallel computing, or other similar devices.

The memory 330 may include various memories such as, for example L1, L2, or L3 cache or system memory. As such, the memory 330 may include static random-access memory (SRAM), dynamic RAM (DRAM), flash memory, read only memory (ROM), or other similar memory devices.

The user interface 340 may include one or more devices for enabling communication with a user and may present information to users. For example, the user interface 340 may include a display, a touch interface, a mouse, and/or a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol or other communications protocols, including wireless protocols. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300. The storage 362 may store instructions for implementing the genomic data protocol. For example, one instance of FIG. 3 may be found at the requestor and may carry out the requestors part of the genomic data protocol. In another example, an instance of FIG. 3 may be found at the responder and may carry out the requestors part of the genomic data protocol. Further, the system 300 of FIG. 3 may implement the webpage 130 or the blockchain 132. Further, the system 300 may be found in the sequencer 212 that produces and signs genomic data, or the system 300 may be found in a server that stores and provides the metical trial data 216.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the system 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Such plurality of processors may be of the same or different types. Further, where the device 300 is implemented in a cloud computing system, the various hardware components may belong to separate physical systems. For example, the processor 320 may include a first processor in a first server and a second processor in a second server.

The genomic data protocol and system described herein provide a technological improvement over current methods and systems for providing genomic data to a requestor. The genomic data protocol and system enables a requestor to publish or advertise a request for genomic data, where the request may indicate the amount of data sought and trusted providers. The requester and provider may then perform a NIZK proof that verifies that the provider has data that meets the requestors requirements and conditions. This allows the requestor to determine that the data obtained from a responder is valid genomic data from a trusted source while maintaining the privacy and secrecy of the genomic data and that the genomic data was not fraudulently generated. This genomic data protocol means that a requestor of data does not need to work with trusted third parties or to go through setting up an authenticated and secure relationship with each potential provider of genomic data. Further, once the requests of the requestor is verified, such verification may be published, and other requestors may rely upon the NIZK proof to verify and obtain the same data as requested by the first requestor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for validating by a requestor that a responder has genomic data meeting specified requirements, comprising:

digitally publishing the specified requirements, wherein the specified requirements comprise at least: (1) a public digital signature key for sources of genomic data that the responder trusts, and (2) a threshold value indicating a minimum amount of trustworthy genomic data required from a responder;

performing a non-interactive zero-knowledge (NIZK) proof with the responder;

verifying that the responder has genomic data meeting the specified requirements based upon the results of the NIZK proof, including the required amount of trustworthy genomic data required from the responder; and receiving, after verifying, encrypted genomic data meeting the specified requirements from the responder.

2. The method of claim 1, wherein the NIZK proof uses one of zero-knowledge succinct non-interactive arguments of knowledge (zk-SNARK) protocol, zero-knowledge scalable and transparent argument of knowledge (zk-STARK) protocol, and succinct non-interactive arguments (SNARG) protocol.

3. The method of claim 1, wherein the specified requirements further include an origin requirement for the genomic data.

4. The method of claim 3, wherein the public digital signature key is for a specific genomic sequencer.

5. The method of claim 3, wherein the origin requirement for the genomic data comprises a requirement for genomic data from a medical trial.

6. The method of claim 1, wherein the NIZK proof receives as input the specified requirements and genomic data with associated digital signatures from the responder that satisfies the specified requirements.

7. The method of claim 6, wherein the digital signature uses elliptic curve digital signature protocol.

8. The method of claim 6, wherein the genomic data is hashed before being input to the NIZK proof.

9. The method of claim 1, wherein the specified requirements are published on one of a webpage or a blockchain.

10. The method of claim 9, further comprising publishing a proving key and a verification key, wherein the proving key and verification key are output from the NIZK proof.

11. A method for providing a validation by a responder that the responder has genomic data meeting specified requirements of a requestor, comprising:

determining that responder has genomic data meeting the specified requirements published by the requestor, wherein the specified requirements include at least: (1) a public digital signature key for sources of genomic data that the responder trusts, (2) a threshold value indicating a minimum amount of trustworthy genomic data required from a responder, and (3) an origin requirement for the genomic data;

performing a non-interactive zero-knowledge (NIZK) proof with the requester;

receiving a request from the requestor for the genomic data meeting the specified requirements; and transmitting encrypted genomic data meeting the specified requirement to the requestor.

12. The method of claim 11, wherein the NIZK proof uses one of zero-knowledge succinct non-interactive arguments of knowledge (zk-SNARK) protocol, zero-knowledge scalable and transparent argument of knowledge (zk-STARK) protocol, and succinct non-interactive arguments (SNARG) protocol.

13. The method of claim 11, wherein the origin requirement for the genomic data comprises a requirement for genomic data from a sequencer and/or a predetermined medical trial.

14. The method of claim 11, wherein the NIZK proof receives as input the specified requirements and genomic data with associated digital signatures from the responder that satisfies the specified requirements.

15. The method of claim 14, wherein the digital signature uses elliptic curve digital signature protocol.

16. The method of claim 14, wherein the genomic data is hashed before being input to the NIZK proof.

17. The method of claim 11, wherein the specified requirements are published on one of a webpage or a blockchain.

18. The method of claim 17, further comprising publishing a proving key and a verification key, wherein the proving key and verification key are output from the NIZK proof.

\* \* \* \* \*